United States Patent
Song

(10) Patent No.: US 10,406,781 B2
(45) Date of Patent: Sep. 10, 2019

(54) COMPOSITE MATERIAL WITH INSERT-MOLDED ATTACHMENT STEEL

(71) Applicant: Hyundai Motor Company, Seoul (KR)

(72) Inventor: Won Ki Song, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 190 days.

(21) Appl. No.: 15/270,130

(22) Filed: Sep. 20, 2016

(65) Prior Publication Data
US 2017/0313030 A1    Nov. 2, 2017

(30) Foreign Application Priority Data
Apr. 28, 2016  (KR) .......... 10-2016-0052105

(51) Int. Cl.
*B32B 3/24* (2006.01)
*B32B 3/30* (2006.01)
(Continued)

(52) U.S. Cl.
CPC .............. *B32B 15/14* (2013.01); *B29C 65/70* (2013.01); *B29C 66/02242* (2013.01); *B29C 66/304* (2013.01); *B29C 66/72* (2013.01); *B29C 66/742* (2013.01); *B29C 66/74283* (2013.01); *B29C 70/72* (2013.01); *B29C 70/845* (2013.01); *B32B 3/266* (2013.01); *B32B 3/30* (2013.01); *B32B 5/02* (2013.01); *B32B 5/24* (2013.01); *B32B 15/18* (2013.01); *B62D 29/005* (2013.01); *B29C 65/54* (2013.01); *B29C 66/12221* (2013.01); *B29C 66/303* (2013.01); *B29C 66/346* (2013.01); *B29C 66/7212* (2013.01); *B29C 70/745* (2013.01); *B29K 2101/00* (2013.01); *B29K 2105/06* (2013.01); *B29K 2705/00* (2013.01); *B29K 2705/12* (2013.01); *B29L 2031/30* (2013.01); *B29L 2031/3002* (2013.01); *B29L 2031/3055* (2013.01);
(Continued)

(58) Field of Classification Search
None
See application file for complete search history.

(56) References Cited

U.S. PATENT DOCUMENTS 4,041,031 A * 8/1977 Heasman ............... A42B 3/227
                                                          264/250
4,068,366 A * 1/1978 Hillesheim .......... B21D 31/046
                                                          29/527.4
(Continued)

FOREIGN PATENT DOCUMENTS

DE    1959277 A1 *  5/1971 ............. B29C 65/02
DE  19834686 A1 *  2/2000 ............. B60Q 25/06
(Continued)

OTHER PUBLICATIONS

Machine Translation of EP 1043215 A2, dated Oct. 2000 (Year: 2000).*

*Primary Examiner* — Jeffrey A Vonch
(74) *Attorney, Agent, or Firm* — Mintz Levin Cohn Ferris Glovsky and Popeo, P.C.; Peter F. Corless

(57) ABSTRACT

A composite material with an insert-molded attachment steel is provided. The composite material includes a plurality of burring apertures, each of which has a flange in one direction on the attachment steel and is inserted between fibers. A resin is then introduced between the fibers in each burring aperture and external to the flange.

13 Claims, 2 Drawing Sheets

(51) Int. Cl.
| | | |
|---|---|---|
| B32B 15/14 | (2006.01) | |
| B32B 15/18 | (2006.01) | |
| B29C 65/54 | (2006.01) | |
| B29C 65/70 | (2006.01) | |
| B29C 70/72 | (2006.01) | |
| B29C 70/74 | (2006.01) | |
| B62D 29/00 | (2006.01) | |
| B32B 5/02 | (2006.01) | |
| B32B 3/26 | (2006.01) | |
| B29C 65/00 | (2006.01) | |
| B32B 5/24 | (2006.01) | |
| B29C 70/84 | (2006.01) | |
| B29K 705/00 | (2006.01) | |
| B29K 105/06 | (2006.01) | |
| B29L 31/30 | (2006.01) | |
| B32B 3/28 | (2006.01) | |
| B32B 7/12 | (2006.01) | |
| B32B 3/06 | (2006.01) | |
| B32B 15/08 | (2006.01) | |
| B29K 705/12 | (2006.01) | |
| B29K 101/00 | (2006.01) | |

(52) U.S. Cl.
CPC . B32B 3/06 (2013.01); B32B 3/28 (2013.01); B32B 7/12 (2013.01); B32B 15/08 (2013.01); B32B 2260/023 (2013.01); B32B 2260/046 (2013.01); B32B 2262/0269 (2013.01); B32B 2262/105 (2013.01); B32B 2305/073 (2013.01); B32B 2305/34 (2013.01); B32B 2307/542 (2013.01); B32B 2311/30 (2013.01); B32B 2398/00 (2013.01); B32B 2605/00 (2013.01); B32B 2605/08 (2013.01); B60Y 2410/123 (2013.01); B60Y 2410/124 (2013.01); B60Y 2410/125 (2013.01); B62D 29/004 (2013.01); Y10T 428/2419 (2015.01); Y10T 428/24174 (2015.01); Y10T 428/24182 (2015.01); Y10T 428/24289 (2015.01); Y10T 428/24331 (2015.01); Y10T 428/24339 (2015.01); Y10T 428/24347 (2015.01)

(56) References Cited

U.S. PATENT DOCUMENTS

| | | | | | |
|---|---|---|---|---|---|
| 4,106,962 | A | * | 8/1978 | Adams | B29C 37/0085 156/73.1 |
| 4,274,901 | A | * | 6/1981 | Elber | B29C 70/086 156/242 |
| 4,673,606 | A | * | 6/1987 | Unden | B29C 37/0085 428/138 |
| 4,764,409 | A | * | 8/1988 | Freeman | B29C 70/023 428/100 |
| 4,805,958 | A | * | 2/1989 | Nagata | B60J 7/053 296/216.07 |
| 4,954,387 | A | * | 9/1990 | Sikorski | B29C 37/0085 428/138 |
| 5,190,803 | A | * | 3/1993 | Goldbach | B29C 37/0085 264/261 |
| 5,580,122 | A | * | 12/1996 | Muehlhausen | B62D 25/081 296/192 |
| 5,656,353 | A | * | 8/1997 | Butler | B60R 13/0869 156/251 |
| 5,672,405 | A | * | 9/1997 | Plank, Jr. | B29C 45/14311 264/273 |
| 6,273,496 | B1 | * | 8/2001 | Guyomard | B62D 25/084 296/193.09 |
| 6,412,855 | B1 | * | 7/2002 | Cantineau | B62D 25/084 296/187.01 |
| 7,802,799 | B1 | * | 9/2010 | Semmes | B29C 65/56 277/616 |
| 2001/0053431 | A1 | * | 12/2001 | Goldbach | B29C 45/14467 428/139 |
| 2002/0160145 | A1 | * | 10/2002 | Bauhoff | B29C 45/14311 428/99 |
| 2002/0168499 | A1 | * | 11/2002 | Goldbach | B29C 45/14467 428/139 |
| 2004/0197534 | A1 | * | 10/2004 | Miller | B32B 3/266 428/195.1 |
| 2005/0175400 | A1 | * | 8/2005 | Behr | B29C 45/14311 403/267 |
| 2005/0229530 | A1 | * | 10/2005 | Schmidt | B29C 45/14311 52/630 |
| 2006/0108059 | A1 | * | 5/2006 | Modin | B29C 70/545 156/252 |
| 2008/0003401 | A1 | * | 1/2008 | Barnes | B29C 65/562 428/99 |
| 2009/0047471 | A1 | * | 2/2009 | Kellenberger | B29C 70/12 428/138 |
| 2009/0065484 | A1 | * | 3/2009 | Wang | B23K 11/115 219/118 |
| 2009/0087259 | A1 | * | 4/2009 | Bettinger | B29C 65/562 403/274 |
| 2009/0272047 | A1 | * | 11/2009 | Gottler | B29C 45/1418 52/96 |
| 2010/0068464 | A1 | * | 3/2010 | Meyer | B23K 15/0086 428/161 |
| 2010/0183848 | A1 | * | 7/2010 | Krause | B29C 45/14778 428/167 |
| 2012/0045613 | A1 | * | 2/2012 | Sanderson | B32B 7/08 428/137 |
| 2013/0149501 | A1 | * | 6/2013 | Pacchione | B29C 66/73751 428/172 |
| 2013/0322962 | A1 | * | 12/2013 | Osada | F16B 3/00 403/361 |
| 2014/0062144 | A1 | * | 3/2014 | Park | B62D 25/06 296/210 |
| 2014/0091495 | A1 | * | 4/2014 | Schmitt | B29C 66/80 264/255 |
| 2014/0159425 | A1 | * | 6/2014 | Kim | B62D 25/06 296/191 |
| 2014/0352880 | A1 | * | 12/2014 | Lepper | B29C 65/56 156/242 |
| 2015/0048654 | A1 | * | 2/2015 | Eipper | B62D 29/004 296/193.06 |
| 2015/0099093 | A1 | * | 4/2015 | Arbesman | B32B 3/30 428/139 |
| 2015/0260208 | A1 | * | 9/2015 | Baker | B21J 15/147 403/282 |
| 2015/0290903 | A1 | * | 10/2015 | Tresse | B29C 70/42 428/139 |
| 2016/0016614 | A1 | * | 1/2016 | Conze | B29C 70/86 296/193.12 |
| 2016/0053788 | A1 | * | 2/2016 | Iwano | B29C 65/70 403/268 |
| 2016/0214518 | A1 | * | 7/2016 | Ter Steeg | B29C 70/30 |
| 2016/0318292 | A1 | * | 11/2016 | Jurgens | B32B 18/00 |
| 2017/0217061 | A1 | * | 8/2017 | Roche | B60N 2/22 |
| 2017/0305474 | A1 | * | 10/2017 | Ryan | B62D 29/004 |
| 2018/0050496 | A1 | * | 2/2018 | Racineux | B23K 20/06 |
| 2018/0099474 | A1 | * | 4/2018 | Song | B32B 3/04 |
| 2018/0244000 | A1 | * | 8/2018 | Essers | B29C 70/688 |

FOREIGN PATENT DOCUMENTS

| | | | | | |
|---|---|---|---|---|---|
| DE | 10342603 | A1 | * | 6/2005 | B62D 25/087 |
| DE | 102004052668 | A1 | * | 5/2006 | B29C 70/24 |
| DE | 102006001444 | A1 | * | 7/2007 | B29C 70/545 |
| DE | 102006027765 | A1 | * | 12/2007 | B29D 25/00 |
| DE | 102008025047 | B3 | * | 9/2009 | B29D 25/084 |
| DE | 102009008662 | A1 | * | 8/2010 | B29D 27/065 |
| DE | 102009017776 | A1 | * | 10/2010 | B29C 65/64 |
| DE | 102011106700 | A1 | * | 3/2012 | B23K 11/11 |
| DE | 102013001943 | A1 | * | 3/2014 | B29C 70/64 |
| DE | 102013205745 | A1 | * | 10/2014 | F16B 17/008 |

(56) References Cited

FOREIGN PATENT DOCUMENTS

| | | | | |
|---|---|---|---|---|
| DE | 102014001128 | A1 * | 7/2015 | ............. B29C 65/56 |
| EP | 0335200 | A1 * | 10/1989 | ............. B62D 25/06 |
| EP | 1043215 | A2 * | 10/2000 | ............. B62D 25/06 |
| FR | 2225989 | A * | 11/1974 | ............... B60Q 1/30 |
| GB | 1290557 | A * | 9/1972 | ............. H02K 3/487 |
| GB | 2002674 | A * | 2/1979 | ....... B29C 45/14344 |
| JP | 10-203101 | A | 8/1998 | |
| JP | 2003305775 | A * | 10/2003 | |
| KR | 10-2006-0020594 | A | 3/2006 | |
| KR | 10-0654058 | B1 | 11/2006 | |
| KR | 10-0942082 | B1 | 2/2010 | |
| KR | 10-2014-0075485 | A | 6/2014 | |
| WO | WO-2007038912 | A1 * | 4/2007 | ....... B29C 45/14344 |
| WO | WO-2012028615 | A2 * | 3/2012 | ............. B29C 70/86 |
| WO | WO-2014131967 | A1 * | 9/2014 | ........... B29D 25/087 |

* cited by examiner

COMPOSITE MATERIAL WITH INSERT-MOLDED ATTACHMENT STEEL

CROSS-REFERENCE TO RELATED APPLICATION

This application claims priority to and the benefit of Korean Patent Application No. 10-2016-0052105 filed in the Korean Intellectual Property Office on Apr. 28, 2016, the entire contents of which are incorporated herein by reference.

BACKGROUND

Field of the Invention

The present invention relates to a composite material with an insert-molded attachment steel, and more particularly, to a insert-molded attachment steel that reinforces the shear strength between the composite material and the attachment steel.

Description of the Related Art

Generally, development of a vehicle requires that the vehicle have a high-strength while also being lightweight. Accordingly, a vehicle body formed from a material such as aluminum or a composite material that is light in weight, has excellent rigidity and a high degree of design freedom compared with a steel material. Since new materials such as aluminum or the composite material are used for the vehicle body as described above, a combination of different materials is required and research and development has been conducted based on the combination of different materials. In particular, there are disadvantages to combining the different materials related to welding properties or corrosiveness. Accordingly, methods of mechanical attachment are largely used, however this has not produced the desired rigidity.

For example, a structure used to connect the composite material and the steel material is implemented by forming an aperture in the composite material. The composite material is fastened to the steel material by bolting through the aperture and as a result, the structure is not appropriate for mass production since assembly process is slow. To reinforce rigidity of the connection between the composite material and the steel material as described above, a connecting member is inserted between the composite material and the steel material. However, the insertion of the connecting member causes the occurrence of cracks since the connecting member is not properly or securely attached to the composite material.

The above information disclosed in this section is merely for enhancement of understanding of the background of the invention and therefore it may contain information that does not form the prior art that is already known in this country to a person of ordinary skill in the art.

SUMMARY

The present invention provides a composite material with an insert-molded attachment steel to improve shear strength between the composite material and the attachment steel by forming the attachment steel. The attachment steel may include a flange disposed between fibers by insert-molding and introduces a resin.

An exemplary embodiment of the present invention provides a composite material with an insert-molded attachment steel that may include a plurality of burring apertures, each of which has a flange in one direction on the attachment steel formed and inserted between a plurality of fibers, resin may be introduced between the fibers in the burring aperture and external to the flange. A shear strength reinforcing portion that reinforces shear strength between the composite material and the attachment steel may be formed.

Additionally, in some exemplary embodiments, at least a portion of the shear strength reinforcing portion may have a thickness greater than a thickness of the composite material and a height of the flange. The flange may be formed in one direction along a circumference of the burring aperture and may be formed in a direction perpendicular to a cross section of the attachment steel. The attachment steel may have a welded end formed along an exterior tip which is not insert-molded in the composite material. In other exemplary embodiments, the burring aperture may be formed as a circular aperture.

According to the exemplary embodiment of the present invention, the shear strength reinforcing portion may be formed by introducing resin between the fibers. The attachment steel may have a flange in one direction formed by insert-molding between the fibers and thus, the thicknesses of the fibers may be increased, and as a result the shear strength between the composite material and the attachment steel may be improved. Additionally, other effects obtained or expected by the exemplary embodiments of the present invention will be directly or implicitly disclosed in the detailed description of the exemplary embodiments of the present invention. That is, various effects expected according to the exemplary embodiments of the present invention will be disclosed in the detailed description to be described below.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DESCRIPTION OF SYMBOLS

1: Vehicle body component
10: Attachment steel
11: Flange
13: Burring aperture
15: Welded end
20: Fiber
30: Resin
40: Shear strength reinforcing portion

DETAILED DESCRIPTION

Hereinafter, an exemplary embodiment of the present invention will be described with reference to the accompanying drawings. However, the drawings illustrated below and the following description relate to one exemplary embodiment among various exemplary embodiments for effectively explaining features of the present invention. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
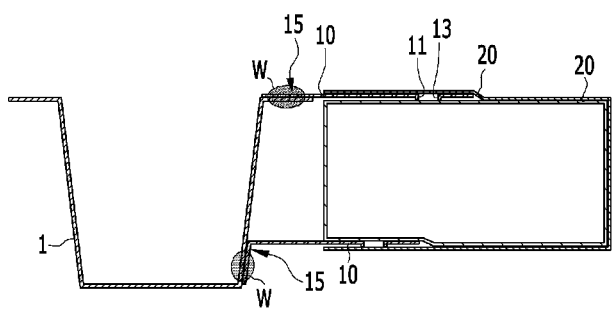
FIG. 1 is an exemplary cross-sectional view of a composite material with an insert-molded attachment steel according to an exemplary embodiment of the present invention.
Figure 2:
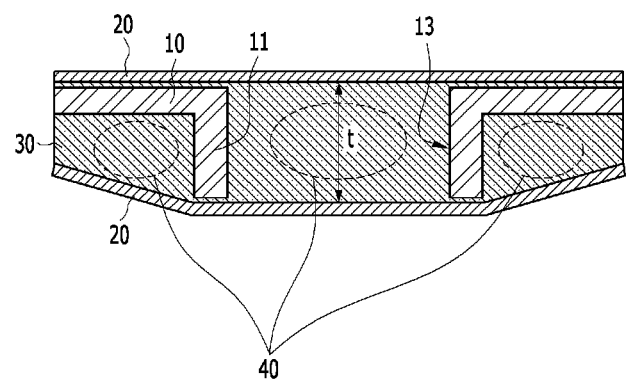
FIG. 2 is an exemplary cross-sectional view of the composite material with the insert-molded attachment steel according to the exemplary embodiment of the present invention.

FIG. 1 is an exemplary cross-sectional view of a composite material with an insert-molded attachment steel according to an exemplary embodiment of the present invention. FIG. 2 is an exemplary cross-sectional view of the composite material with the insert-molded attachment steel according to the exemplary embodiment of the present invention. Referring to FIGS. 1 and 2, the composite material with the insert-molded attachment steel (hereinafter, referred to as the composite material) according to the exemplary embodiment of the present invention may be applied to securely attach a vehicle body component 1 via an insert-molded attachment steel 10.

The composite material may include a plurality of burring apertures 13 having flanges 11 in one direction on the attachment steel 10. In particular, the flange 11 may be formed in one direction along a circumference of the burring aperture 13 and may be formed in a direction perpendicular to a cross section of the attachment steel 10. In the exemplary embodiment of the present invention, the flange 11 may be formed in the direction perpendicular to the cross section of the attachment steel 10, but the present invention is not necessarily limited thereto, and a direction and an angle of the flange 11 may be adjusted. Further, the burring aperture 13 may be formed as a circular aperture.

Further, resin 30 may be introduced into fibers 20 when the attachment steel 10 is formed between the fibers 20 by insert-molding. In particular, two layers of fibers 20 according to the exemplary embodiment of the present invention are illustrated for convenience as an example, but the present invention is not necessarily limited thereto and various layers may be formed to overlap each other. A shear strength reinforcing portions 40 may be formed between the fibers 20 when the resin 30 is introduced in the burring aperture 13 and external to the flange 11.

The shear strength reinforcing portion 40 may improve shear strength between the fibers 20 and the attachment steel 10. At least a portion of the shear strength reinforcing portion 40 may have a thickness greater than a thickness of the composite material and a height of the flange 11. In other words, a thickness t of the composite material may vary based on a thickness of the shear strength reinforcing portion 40. The thickness of the shear strength reinforcing portion 40 may vary based on a height of the burring aperture 13.

The composite material configured as described above may be formed from fiber reinforced plastic (FRP). The fiber reinforced plastic may refer to a composite material that may be reinforced by using glass fibers as a reinforcing material and impregnating the resin. Additionally, the fiber reinforced plastic may be lightweight and may have excellent formability. In particular, the fiber reinforced plastic may be applied as a lightweight material with an increased strength and improved elasticity by using a new material that may include a carbon fiber, an aramid fiber, and a reinforcing fiber or the like, as a reinforcing material. Further, welded ends 15 may be formed along an exterior tip which is not insert-molded between the attachment steel 10 and the fibers 20. The welded end 15 may couple the vehicle body component 1 to the composite material and one side tip portion thereof may be bent.

FIG. 1 illustrates that the two attachment steels 10 may be formed by insert-molding to couple the composite material to the vehicle body component 1 and to form the two welded ends 15. In other words, a first welded end 15 may be formed at a portion where the attachment steel 10 extends toward the vehicle body component 1, and a second welded end 15 may be formed at a portion where the attachment steel 10 extends and is bent. The number of attachment steels 10 and the number of welded ends 15 may be determined by a shape of the vehicle body component 1 intended to be coupled to the composite material. In particular, the attachment steel 10 may be coupled by welding W to the vehicle body component 1 along the welded ends 15 at the exterior tip and the attachment strength may be improved.

Therefore, the composite material with the insert-molded attachment steel 10 according to the exemplary embodiment of the present invention may improve shear strength between the attachment steel 10 and the composite material. In particular, the resin 30 may be introduced when the attachment steel 10 formed with the plurality of burring apertures 13 having the flange 11 in one direction that may be formed by insert-molding between the fibers 20. Further, the composite material with the insert-molded attachment steel 10 may improve attachment strength even though the thickness of the attachment steel 10 is not increased by the shear strength reinforcing portion 40 formed by the burring aperture 13. The attachment steel 10 may be coupled by welding W, to the vehicle body component 1 through the welded ends 15 at the exterior tip and may improve the attachment strength.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A composite material, comprising:
a first fiber layer and a second fiber layer;
an attachment steel comprising at least one embedded portion positioned between the first and second fiber layers and a corresponding attachment portion extending therefrom and not positioned between the first and second fiber layers;
the embedded portion comprising a plurality of burring apertures each having a peripheral flange extending a height from a surface of the attachment steel toward the first or second fiber layer; and
a resin introduced between the first and second fiber layers, the resin surrounding the at least one embedded portion, extending into the burring apertures and around the peripheral flanges;
wherein the resin extending into each of the burring aperture forms a shear strength reinforcing portion between the first and second fiber layers and the attachment steel, a thickness of the shear strength reinforcing portion defined as the distance between the first and second fiber layers,
wherein the thickness of the shear strength reinforcing portion is greater than the height of the peripheral flange.

2. The composite material of claim 1, wherein the peripheral flange is formed along an entire periphery of each burring aperture and extends perpendicular to the surface of the attachment steel.

3. The composite material of claim 1, wherein each burring aperture is formed as a circular aperture.

4. The composite material of claim 1, wherein the resin extending around each of the peripheral flanges forms a further shear strength reinforcing portion, a thickness of the further shear strength reinforcing portion defined as the distance between the surface of the attachment steel and the first fiber layer or the second fiber layer the peripheral flange extends toward.

5. The composite material of claim 4, wherein the thickness shear strength reinforcing portion is greater than the thickness of the further shear strength reinforcing portion.

6. The composite material of claim 5, wherein the thickness shear strength reinforcing portion is greater than a thickness between the first and second fiber layers at a location of the embedded portion not having a burring aperture.

7. The composite material of claim 6, wherein the thickness of the further shear strength reinforcing portion is graduated as it transitions from the shear strength reinforcing portion to locations of the embedded portion not having a burring aperture.

8. The composite material of claim 1, where the fibers are carbon fibers or aramid fibers.

9. The composite material of claim 1, wherein the corresponding attachment portion comprises a welded end.

10. The composite material of claim 9, wherein the at least one embedded portion comprises a first embedded portion and its corresponding attachment portion comprises a first welded end, the first welded end being welded to a vehicle body component.

11. The composite material of claim 10, further comprising a second embedded portion and its corresponding attachment portion is bent at an angle relative to the first welded end and comprises a second welded end, the second welded end also being welded to the vehicle body component.

12. A method of forming the composite material of claim 1, comprising:
forming the plurality of burring apertures in at least one portion of the attachment steel;
positioning the at least one portion between the first and second fiber layers, the at least one portion having the corresponding attachment portion extending therefrom and not positioned between the first and second fiber layers; and
introducing the resin between the first and second fiber layers via insert molding, the resin surrounding the at least one portion, extending into the burring apertures and around the peripheral flanges, forming the at least one embedded portion.

13. The method of claim 12 further comprising:
forming the peripheral flange along an entire periphery of each burring aperture; and
forming the peripheral flange as extending perpendicular from the surface of the attachment steel.

* * * * *